United States Patent [19]

Thein et al.

[11] Patent Number: 5,152,856
[45] Date of Patent: Oct. 6, 1992

[54] CURE/BONDING METHOD FOR SANDWICHED PLASTIC STRUCTURE

[75] Inventors: Joe K. Thein, Torrance; Flerida B. Uldrich, Westminster, both of Calif.

[73] Assignee: Northrop Corporation, Los Angeles, Calif.

[21] Appl. No.: 555,868

[22] Filed: Jul. 20, 1990

Related U.S. Application Data

[63] Continuation-in-part of Ser. No. 222,600, Jul. 21, 1988, abandoned.

[51] Int. Cl.⁵ .................... B29D 9/00; B32B 31/26
[52] U.S. Cl. ............................ 156/79; 156/245; 264/46.6; 264/321
[58] Field of Search ................. 156/77, 79, 245; 521/88, 94, 149; 264/45.5, 45.6, 46.6, 321

[56] References Cited

U.S. PATENT DOCUMENTS

| | | | |
|---|---|---|---|
| 3,906,137 | 9/1975 | Bauer | 156/247 |
| 4,187,353 | 2/1980 | Schroeder | 521/149 |
| 4,292,101 | 9/1981 | Reichert | 156/245 |
| 4,316,934 | 2/1982 | Maier et al. | 264/257 |
| 4,359,160 | 11/1982 | Myers et al. | 264/DIG. 13 |
| 4,665,104 | 5/1987 | Bitsch | 264/DIG. 5 |
| 4,826,723 | 5/1989 | Brambach | 156/214 |
| 4,850,607 | 7/1989 | Trimble | 280/281.1 |
| 4,902,458 | 2/1990 | Trimble | 264/46.6 |

FOREIGN PATENT DOCUMENTS 1184106 3/1985 Canada.

OTHER PUBLICATIONS

Kirk-Othmer Encyclopedia of Chemical Technology, vol. II, 1980, pp. 98, 99.

*Primary Examiner*—Michael W. Ball
*Assistant Examiner*—Steven D. Maki
*Attorney, Agent, or Firm*—Terry J. Anderson; Robert B. Block; Karl J. Hoch

[57] ABSTRACT

In a process for making a bonded article having a rigid foam core and a cured fiber-impregnated resin composite skin external of the foam core, a skin of a curable fiber-impregnated resin composite material is overlayed onto a shaped rigid foam core formed of a resin material that below is thermoelastic point is inflexible to expansion by internal gas expansion and below it thermoelastic point has a positive coefficient of thermal expansion. The composite material is chosen to have a cure temperature that is below the thermoelastic temperature of the foam core material. The foam core having the skin thereon is loaded into the cavity of a mold. The mold is closed, secured and heated to the cure temperature of the fiber-impregnated resin composite material to cure the fiber-impregnated resin composite material and to thermally expand the foam core via its positive coefficient of thermal expansion. This consolidates the fiber-impregnated resin composite material and unifies it with the foam core into a bonded structure.

17 Claims, 1 Drawing Sheet

CURE/BONDING METHOD FOR SANDWICHED PLASTIC STRUCTURE

This application is a continuation-in-part of application Ser. No. 07/222,600 filed on Jul. 21, 1988 now abondoned.

FIELD OF THE INVENTION

The invention relates to the field of manufacturing articles having a foam core enclosed within a cover layer of skin material and to articles prepared by this process. More particularly it includes a process for simultaneously curing a composite skin and bonding it under pressure to a polymerized rigid foam core wherein the bonding pressure is achieved via thermal expansion of the rigid foam core.

BACKGROUND OF THE INVENTION

Articles requiring a high strength to weight ratio, such as aircraft structural parts, are increasingly being manufactured by surfacing a rigid structural foam core with a hard smooth skin material. There have been many prior art attempts to obtain rigid structural foam cores having a hard smooth skin material thereon. Bauer in U.S. Pat. No. 3,906,137, and Brand et al in U.S. Pat. No. 4,335,182, produce such composite bodies by heating structural foam above its softening temperature. Brand et al compressed the core to predensify it and then heat it to a foaming temperature for expansion. This requires the use of an autoclave or other external pressure source. Smith in U.S. Pat. No. 3,873,654, Reichert in U.S. Pat. No. 4,292,101 and the Bauer patent teach composite body consolidation methods that require application of compression pressure directly to the core.

Other prior art methods include those of Engelke et al in U.S. Pat. No. 4,521,354, McCarthy in U.S. Pat. No. 4,471,020, Carter in U.S. Pat. No. 4,321,825 and Doerfling in U.S. Pat. No. 4,379,103 who use cast-in-place, unpolymerized (uncured) foam materials in a sandwich structure.

In U.S. Pat. 4,187,353 to Schroeder, the inventor overlays the top and bottom surfaces of a polyacrylimide-polymethacrylimide foam block with a polyester prepreg and then heats the structure to 145° C. in a hydraulic press under $1.5N/mm^2$ (218 psi) pressure for three minutes. The structure was removed from the press in a hot state. It had changed shape to the shape of the cavity of the tool since as noted by Schroeder "the shaped piece . . . (was) free of portions assuming the shape of the original form . . . and is of a thickness which corresponds to the cavity of the tool". In this process the geometry of the formed article obviously changes from that of the starting foam block. In "rigid" foams, if the structural integrity of the material is to be maintained, geometry changes can only be effected above the softening temperature of the material. In his examples, this inventor's structures are formed in a press utilizing the application of external pressure. The pressures utilized by Schroeder were typically much higher that those commonly utilized in the aircraft industry. In the aircraft industry, the maximum pressure typically utilized is 100 psi and this is normally only attainable in conjunction with the use of an autoclave.

In a further U.S. patent, U.S. Pat. No. 4,292,101 to Reichert, the inventor describes a process that uses an expanding closed cell "depressible" core of a polyether, a silicone rubber, a phenolic or an epoxy material. This core is overlayed with a lay-up of skin material that will form the product being molded. The core and the skin material are then compressed into a mold under "an initial prestress compression force" as the mold is closed. The mold is heated to "expand the gases captured within the cellular core . . . causing it to exert hydraulic forces . . . " Such expansion of the core by the gases trapped therein is achieved by utilizing as core materials, materials that in the words of the inventor "plasticizes sufficiently when heated". In this process it is evident that the core materials are raised to a temperature above their softening temperature, i.e. their thermoelastic temperature, for such plasticizing to take place.

SUMMARY OF THE INVENTION

The present invention includes a process whereby the internal pressure generated by simple thermal expansion of a foam core compresses a skin against the inside wall of a closed cavity mold to produce sandwich-structured articles from precast, polymerized foam core materials. Such precast materials can be, for example, polymethacrylimide having the commercial trade name Rohacell WF Rigid Foam. This material is commercially available only in polymerized billet form.

Unlike the prior art methods, this invention does not heat the foam core above its thermoelastic temperature. Further it does not make use of foaming type expansion. Instead the process of this invention relies on simple thermal expansion, well below the thermoelastic temperature of the foam core. This thermal expansion of the core is used for consolidation of a skin layer and bonding of the core with that skin layer.

According to a method of the invention, a structural foam core having a curable skin layer is introduced into a mold cavity without compression. The components of the mold are secured together against separation and the structural foam core material and the curable skin layer are heated to a temperature sufficient to cure the skin layer but at a temperature that is below the thermoelastic temperature of the foam core. At such temperature the foam core thermally expands compressing the skin layer against the internal walls of the mold cavity for consolidation of the skin layer. Further at such temperature the skin layer cures during the consolidation and intimately bonds to the foam core. Thus the covering material is thermally cured at a temperature below the thermoelastic temperature of the core but at a temperature wherein core member is heat expanded by its coefficient of thermal expansion.

A preferred material for the foam core is rigid polymethacrlylimide foam. For aircraft construction such foam is chosen to have a density less than 6.9 lbs. per cubic foot. Preferred materials for the skin layer are curable fiber-impregnated resin composite materials selected from the group consisting of carbon fibers, glass fibers, quartz fibers or Kevlar fibers in an epoxy or other suitable resin. Curing of these skin layer materials is preferrably effected in a temperature range of from 250° F. to 350° F. Such temperature range is below the thermoelastic temperature of the polymethacrylimide foams.

According to the invention, an article incorporating a skin covered rigid foam core includes a rigid foam core of a rigid foamed resin material that has a thermoelastic point below which said material is so stiff as not to be bendable without breaking, below which said material is incompressible without breaking, below which said material is inflexible to internal gas expansion and below which said material has a positive coefficient of thermal expansion. The form core is overlayed with an external skin of fiber-impregnated resin composite material having a cure temperature below the thermoelastic temperature of the foam core. The external skin is cured, consolidated and intimately bonded to the foam core by heating the skin covered foam cored article in a closed mold cavity at a temperature sufficient to effect curing of the fiber-impregnated resin composite material but below the thermoelastic temperature of the rigid foam core. This cures the fiber-impregnated resin composite material while simultaneously retaining the rigidity of the foam core. During heating, the core outwardly thermally expands as the result of its positive coefficient of thermal expansion to consolidate the fiber-impregnated resin composite material against the walls of the mold and to unify the consolidated fiber-impregnated resin composite material and the foam core into an intimately bonded structure.

It was an object of this invention to provide a structural foam sandwich structure that is formed without autoclaving or pre-compressing the material.

It was a further object of this invention to provide a structural foam laminated structure having accurate external dimensions and a controlled density.

It was still a further object of this invention to provide a method of producing laminated sandwich structures having structural foam cores of either simple or complex shapes.

These and other objects of the invention will be apparent from the attached drawings and the following detailed description of the invention wherein a preferred embodiment of the invention is described.

DETAILED DESCRIPTION OF THE PREFERRED EMBODIMENT

Figure 1:
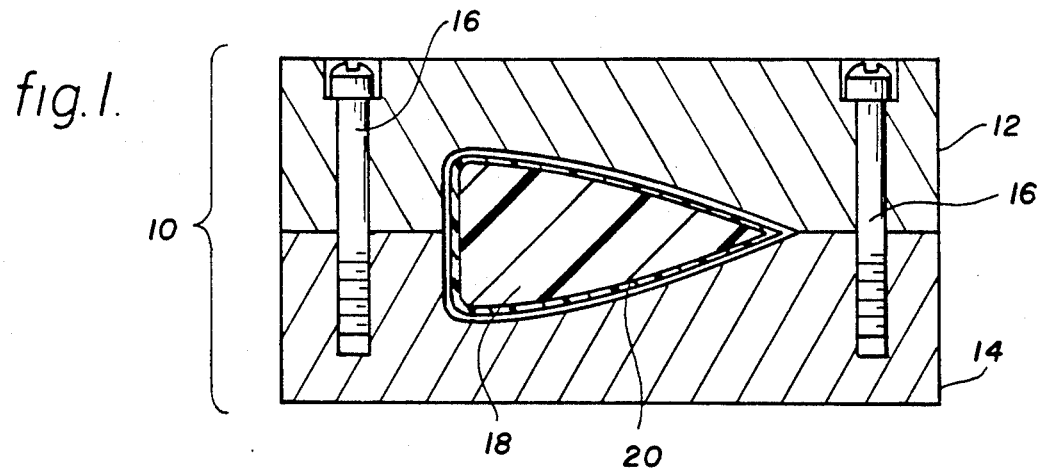
FIG. 1 is a side elevational view in cross-section of a secured two-piece cavity mold enclosing a work piece comprising a composite external skin surrounding a foam core as used in a process of consolidation in accordance with the present invention.

Shown in FIG. 1 is a cross-sectional side view of a closed cavity multiple component or split cavity mold 10. The mold 10 has an upper half 12 and a lower half 14 secured together by bolts 16. Alternatively press platens (not shown) could be used to hold the mold components 12 and 14 secure. With use of a press platen the securing bolts 16 may be eliminated, or else utilized for mold alignment purposes, recessed as shown to avoid interference with the press platen.

Irrespective of whether the bolts 16, press platens or some other clamping or securing means is used, such bolts 16, press platen or other means are only utilized to retain the multiple parts of the mold together against expansion from within. The bolts 16, press platens and the like are not used in pre-compressing, compressing or otherwise subjecting the contents loaded into the mold to any external pressure either during loading or during curing.

For the purposes of this specification and the claims attached hereto, the thermoelastic temperature of a foam product is defined as the temperature at which it softens and thus becomes formable (and gas expandable). The foam core 18 is formed of polymerized rigid foam plastic material. Below its thermoelastic temperature such a rigid foam is so stiff as not to be bendable without breakage, is incompressible without breakage and is inflexible to internal gas expansion. Further the foam core 18 is selected to have a positive coefficient of thermal expansion at temperatures below its thermoelastic temperature.

A useful foam core material for the core 18 for aircraft construction is aircraft grade rigid polymethacrylimide foam. This foam is a "rigid" foam that is self supporting, nonflexible and non-compressible at temperatures below its thermoelastic point. Surface compression, consolidation, densification or other such treatment can only be practiced at temperatures above its thermoelastic point. Such foams are available from Röhm under the tradename "Rohacell WF". A particularly useful foam is Rohacell WF 110.

Prior to being load into the mold 10, the foam core 18 can be shaped or otherwise formed. Such pre-shaping or forming is done using standard practices as for instance by machining, sanding and/or other processes that could include expansion molding. Since the above noted Rohacell WF is only available in billet form, prior to loading into the mold the foam core 18 is formed from such a rigid billet to a specified size and shape corresponding to the article to be manufactured and to the shape of the cavity of the mold 10 allowing for the thickness of the skin.

The core 18 is overlayed or covered with a preferred fiber-reinforced resin-impregnated composition skin 20, which may be uncured or in a prefabricated form as for instance a prepreg. The composition of the skin material is selected such that it has a processing or cure temperature lower than the thermoelastic or softening temperature of the material forming the core 18. Particularly useful as fiber reinforcement materials are carbon, glass, quartz, kevlar, or other fibrous materials. Particularly useful as the resin are thermosetting epoxies, or other resin materials with curing temperatures that are in the same range as those required to generate the necessary thermal expansion pressure for the polymerized foam. Given this disclosure, other fibers and resins might also be suggested to the art skilled. In selecting such other fibers and resins they will be selected such that the composite structure formed from such other fibers and resins has a cure temperature that is below the thermoelastic temperature of the material utilized for the core 18.

The mold cavity, core 18 and skin 20 are dimensioned such that they fit snugly together, as is shown in FIG. 1, at room temperature but without the necessity of using a press or the like to close the mold about the core 18 and skin 20. As so dimensioned the core 18 and skin 20 can be closed in the cavity of the mold 10 with only very light hand pressure or the like generally less than 10 psi. No compression of the foam 18 is necessary or desirable to close the mold. After the mold 10 is closed about the core 18 and the skin 20, the bolts 16 are then used to secure or hold the mold parts 12 and 14 from coming apart in response to expansion of the core 18 when it is later heated to effect curing and consolidation of the skin 20. Once closed and secured, the mold 10 can be loaded onto a heating means.

Heat is applied uniformly to the mold 10, as for instance through heated press platens, an oven, an autoclave or the like, to bring the entire assembly of FIG. 1 up to the curing temperature of skin 20 but still keeping it below the thermoplastic temperature of core 18. Since the material of the core 18 is chosen to have a positive coefficient of thermal expansion at temperatures below its thermoelastic temperature, it expands. This expansion generates outward pressure at all its surfaces. Since the size of the mold cavity is fixed and since the mold pieces are firmly held together by bolts 16, the thermal expansion of the core 18 compacts or consolidates the skin 20 against the inside walls of the cavity of the mold 10.

As the skin 20 is heated its softens and cures. The expansion of the core 18 not only consolidates the skin but it also bonds the core 18 into an intimate bond with the curing skin 20. This bond becomes permanently set upon completion of the curing process of skin 20 and cooling of the mold 10.

Figure 2:
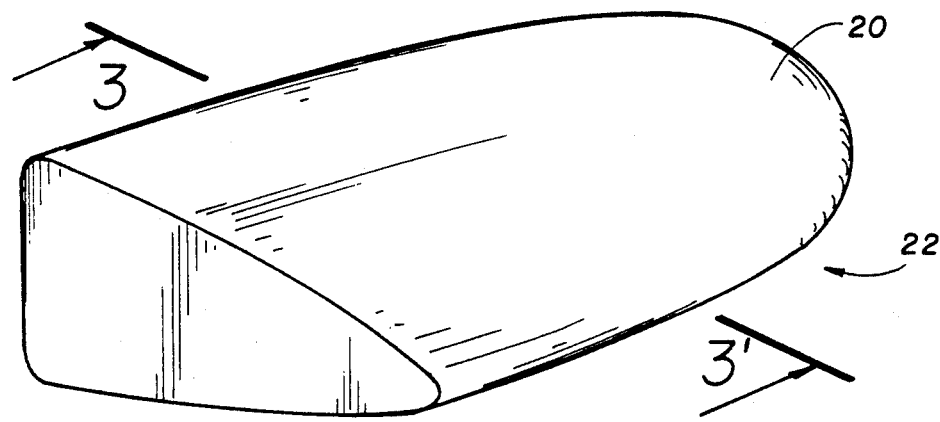
FIG. 2 is a perspective view of the workpiece of FIG. 1 after processing and removal from the mold.
Figure 3:
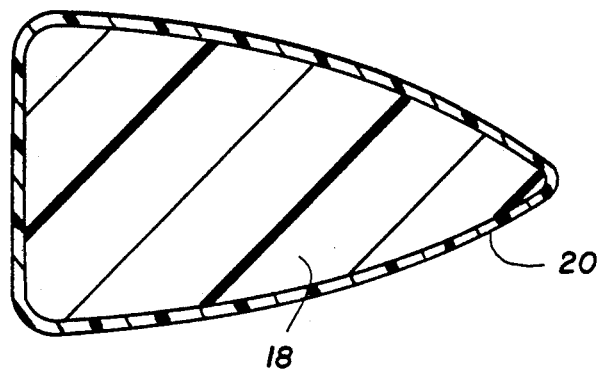
FIG. 3 is a cross-sectional view of the processed workpiece of FIG. 2 taken about the line 3-3' of FIG. 2.

Upon removal from the mold 10, a finished workpiece 22, as seen in the perspective view of FIG. 2, is obtained. Its external cured skin 20 presents a smooth outer surface. The inner surface of the skin 20 has now become intimately bonded to the outer surface of core 18.

The process, according to the invention, depends mainly on the simple thermal expansion of the core material below its thermoelastic temperature. No chemical reaction occurs within the foam. There is no additional foaming of the foam that might change its density and, other than the bond between the skin and the foam core, the foam core does not impregnate the skin material. Further since the temperature was maintained below the thermoelastic temperature of the foam, the foam did not soften and become flexible allowing gas expansion within the cells of the foam to occur. Such gas expansion could also change the density of the foam and thus the performance characteristics of the bonded component structure.

The process according to the invention requires no compression pressure directly to the structural foam core. Nor does it use cast in place, unpolymerized and uncured foam materials. The foam material used according to the invention in its preferred aspects does not undergo chemical reaction and does not impregnate the skin material.

The process taught by this invention is applicable both to commercial articles and to high-performance aircraft structural articles that use polymerized (already cured) high-performance foam materials. For high-performance aircraft structural articles rigid polymethacrylimide foams having foam densities under 6.9 pounds per cubic foot are preferred.

For use with this invention, presently preferred cure temperature for the fiber-impregnated resin composite skins will be in the range of from about 250° F. to about 350° F. Presently preferred materials for the core 18 have thermoelastic temperatures in the range of from about 356° F. to about 446° F. As such the cure temperatures of the skin component is always less than or below the thermoelastic temperatures of the core component.

Generally as the density of the foam core component 18 goes down its thermoelastic temperature increases and as its density increases it thermoelastic temperature decreases. Thus for the lower density core foams preferred for aircraft usage, i.e. polymethacrylimide foams generally having a density below 6.9 lbs per cu ft., and for even lower density foams, higher thermoelastic temperature are experienced. This thus expands the cure temperature range of the skin material and thus expands the spectrum of suitable skin materials. Skin materials having very high cure temperatures (over 400° F. and up to about 446° F.) could thus be used with such low density foam cores.

Generally when the mold 10, including the foam core 18 and skin 20 located herein, is heated to the cure temperature of the skin 20, internal pressures generated solely by the thermal expansion of the core 18 will range from about 50 psi to about 100 psi. Using heated platens at a cure temperature of 350° F. and a Rohacell WF 110 foam having a density of 6.9 lbs per cu ft. as the material for the core 18, a pressure of 100 psi was measured within the cavity of the mold 10. This pressure was achieved without the use of an external press or autoclave and is equal to the maximum pressure normally utilized in the aircraft industry during fabrication of aircraft structural components.

After heating, cure and consolidation of the core and skin is completed, the mold 10 is generally cooled to below 200° F. before demolding of the intimately bonded core and skin article of the invention. Upon removal from the mold 10 this structure is stable as to both shape and dimension. Further it is stable as to delamination of the skin from the core since these components of the structure are intimately bonded together.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes that come within the meaning and range of equivalency of the claims are therefore intended to be embraced therein.

What is claimed is:

1. A process for making a bonded article having a rigid foam core and a cured fiber-impregnated resin composite skin external of the foam core comprising:
   providing a multiple piece mold having an interior cavity;
   providing a shaped rigid foam core formed of a resin material that below its thermoelastic point is inflexible to expansion by internal gas expansion and below its thermoelastic point has a positive coefficient of thermal expansion;
   providing a curable, fiber-impregnated resin composite material having a cure temperature below said thermoelastic temperature of said rigid foam core;
   covering said rigid foam core with a skin of said fiber-impregnated resin composite material;
   placing said skin covered foam core in the mold cavity;
   closing said mold around said skin covered foam core without compressing said skin covered foam core;
   retaining the individual mold pieces of said multiple piece mold fixed together; and
   heating said skin covered foam core in said mold cavity to the cure temperature of said fiber-impregnated resin composite material, and at a temperature below the thermoelastic temperature of said foam core to cure said fiber-impregnated resin composite material and to thermally expand said foam core via its said positive coefficient of thermal expansion, without application of external pressure, to consolidate said fiber-impregnated resin composite material and to unify said consolidated fiber-impregnated resin composite material and said foam core.

2. The process of claim 1 wherein said rigid foam core is a polymethacrylimide foam.

3. The process of claim 1 wherein the resin component of said curable fiber-impregnated resin composite material is a thermosetting resin having a cure temperature below the thermoelastic temperature of said rigid foam core.

4. The process of claim 1 wherein said curable fiber-impregnated resin composite material is selected from the group of materials consisting of carbon fibers, glass fibers, quartz fibers or aromatic polyamide fibers in an epoxy resin.

5. The process of claim 1 wherein said cure temperature is a temperature in the range of from about 250° F. to 350° F.

6. The process of claim 1 wherein said cure temperature is a temperature of less than 350° F.

7. The process of claim 1 further including:
cooling said article after said curing, consolidation and unification;
opening said mold; and
removing said article from said cavity.

8. The process of claim 7 wherein said heated, cured, consolidated and unified article is cooled to a temperature below 200° F. prior to opening said mold.

9. The process of claim 1 wherein said mold is closed around said skin covered foam core without compressing said skin covered foam core by closing said mold around said skin covered foam core at a pressure of less than about 10 psi.

10. The process of claim 1 wherein said rigid foam core has a density of less than 6.9 pounds per cubic foot.

11. A process for making an intimately bonded sandwiched article having a rigid foam core and a cured fiber-impregnated resin composite skin external of the foam core comprising:
providing a multiple piece mold having an interior cavity shaped to conform to the shape of said article;
providing a rigid polymethacrylimide foam core that below its thermoelastic point is so stiff as not to be bendable without breaking and below its thermoelastic point is inflexible to internal gas expansion and below its thermoelastic point has a positive coefficient of thermal expansion;
forming said foam core into the shape conforming generally to the shape of the cavity and the article;
providing a curable fiber-impregnated resin composite material having a cure temperature below said thermoelastic temperature of said rigid polymethacrylimide foam core;
covering said rigid polymethacrylimide foam core with a skin of said fiber-impregnated resin composite material to form a sandwich structure;
placing said sandwich structure in the mold cavity;
closing said mold around said sandwich structure under hand pressure of about less than about 10 psi;
securing the individual mold pieces of said multiple piece mold together against thermal expansion of said sandwich structure in said mold cavity; and
heating said sandwich structure in said mold cavity at the cure temperature of said fiber-impregnated resin composite material but below the thermoelastic temperature of said rigid polymethacrylimide foam core to cure said fiber-impregnated resin composite material and to simultaneously retain the rigidity of said polymethacrylimide foam core while outwardly thermally expanding said polymethacrylimide foam core via its said positive coefficient of thermal expansion to consolidate said fiber-impregnated resin composite material against the walls of said mold and to unify said consolidated fiber-impregnated resin composite material and said polymethacrylimide foam core into an intimately bonded structure.

12. The process of claim 11 wherein said mold is closed around said sandwich structure under said hand pressure of about less than about 10 psi so as not to compress said sandwich structure.

13. The process of claim 11 wherein said curable fiber-impregnated resin composite material is selected from the group of materials consisting of carbon fibers, glass fibers, quartz fibers or aromatic polyamide fibers in an epoxy resin.

14. A process for making an intimately bonded sandwiched article having a rigid foam core and a cured fiber-impregnated resin composite skin external of the foam core comprising:
providing a multiple piece mold having an interior cavity shaped to conform to the shape of said article;
providing a rigid foam core formed of a resin material having a thermoelastic point below which said material is so stiff as not to be bendable without breaking and below which said material is inflexible to internal gas expansion and below which said material has a positive coefficient of thermal expansion;
forming said foam core into the shape conforming generally to the shape of the cavity and the article;
providing a curable fiber-impregnated resin composite material having a cure temperature below said thermoelastic temperature of said foam core;
covering said foam core with a skin of said fiber-impregnated resin composite material to form a sandwich structure;
placing said sandwich structure in the mold cavity;
closing said mold around said sandwich structure without compressing said sandwich structure;
securing the individual mold pieces of said closed multiple piece mold together against thermal expansion of said sandwich structure in said mold cavity;
selecting an elevated temperature within the range from a minimum temperature equal to the cure temperature of said fiber-impregnated resin composite material and a maximum temperature equal to a temperature that is below said thermoplastic temperature of said foam core; and
heating said sandwich structure in said mold cavity at said elevated temperature to cure said fiber-impregnated resin composite material and to simultaneously outwardly thermally expand said foam core via its said positive coefficient of thermal expansion to consolidate said fiber-impregnated resin composite material against the walls of said mold and to unify said consolidated fiber-impregnated resin composite material and said foam core into an intimately bonded structure.

15. The process of claim 14 wherein said maximum temperature selected as a temperature in the range of from about 356° F. to 446° F.

16. The process of claim 14 wherein said elevated temperature is selected as a temperature of about 250° F. to about 350° F.

17. The process of claim 14 wherein said rigid foam core is a polymethacrylimide foam.

* * * * *